(12) United States Patent
Ahmed

(10) Patent No.: US 12,042,989 B2
(45) Date of Patent: Jul. 23, 2024

(54) COMPOSITE 3D-PRINTED CURVED ELEMENTS AND METHOD OF MAKING SAME

(71) Applicant: UNITED ARAB EMIRATES UNIVERSITY, Al Ain (AE)

(72) Inventor: Waleed Khalil Ahmed, Al Ain (AE)

(73) Assignee: UNITED ARAB EMIRATES UNIVERSITY, Al Ain (AE)

( * ) Notice: Subject to any disclaimer, the term of this patent is extended or adjusted under 35 U.S.C. 154(b) by 0 days.

(21) Appl. No.: 17/864,048

(22) Filed: Jul. 13, 2022

(65) Prior Publication Data

US 2024/0017485 A1 Jan. 18, 2024

(51) Int. Cl.
*B29C 64/188* (2017.01)
*B29C 64/147* (2017.01)
*B29C 64/264* (2017.01)
*B29L 25/00* (2006.01)
*B33Y 10/00* (2015.01)
*B33Y 40/20* (2020.01)
*B33Y 80/00* (2015.01)

(52) U.S. Cl.
CPC .......... *B29C 64/188* (2017.08); *B29C 64/147* (2017.08); *B29C 64/264* (2017.08); *B33Y 10/00* (2014.12); *B33Y 40/20* (2020.01); *B33Y 80/00* (2014.12); *B29L 2025/00* (2013.01)

(58) Field of Classification Search
CPC ... B29C 64/188; B29C 64/147; B29C 64/264; B33Y 10/00; B33Y 80/00; B33Y 40/20; B29L 2025/00
See application file for complete search history.

(56) References Cited

U.S. PATENT DOCUMENTS

| 5,357,726 A | 10/1994 | Effenberger et al. |
| 2015/0217516 A1 | 8/2015 | Yakubov et al. |
| 2016/0107379 A1 | 4/2016 | Mark et al. |
| 2018/0072040 A1 | 3/2018 | Mark et al. |
| 2020/0040566 A1 | 2/2020 | Park |

FOREIGN PATENT DOCUMENTS

| WO | 9209429 A1 | 6/1992 |
| WO | 2015042422 A1 | 3/2015 |

OTHER PUBLICATIONS

Dental Filling Procedure, Feb. 2019.*
Dwamena, "How To Strengthen Finished 3D Prints: Use of Epoxy Coating," © 2022 Copyright 3D Printerly: https://3dprinterly.com/how-to-make-3d-printed-parts-stronger/.

* cited by examiner

*Primary Examiner* — Shane Fang
(74) *Attorney, Agent, or Firm* — Nath, Goldberg & Meyer; Joshua B. Goldberg

(57) ABSTRACT

The composite 3D-printed curved elements and methods of making same provide arches and domes with high resistance to shear and flexural failure, thereby allowing the production of large, curved 3D-printed elements. The elements include a primary composite fused deposition modeling (FDM) 3D-printed component in the form of an arch or dome with one or more grooves on the outer surface, the inner surface, or both the outer and inner surfaces of the component. Each groove includes a plurality of deep, blind bores or slots spaced longitudinally along the bottom of the groove. In adjacent grooves, the slots are alternated in a zig-zag pattern, so that no two slots are too close to one another. Composite reinforcement materials are sequentially applied to the grooves and slots until they are filled.

9 Claims, 3 Drawing Sheets

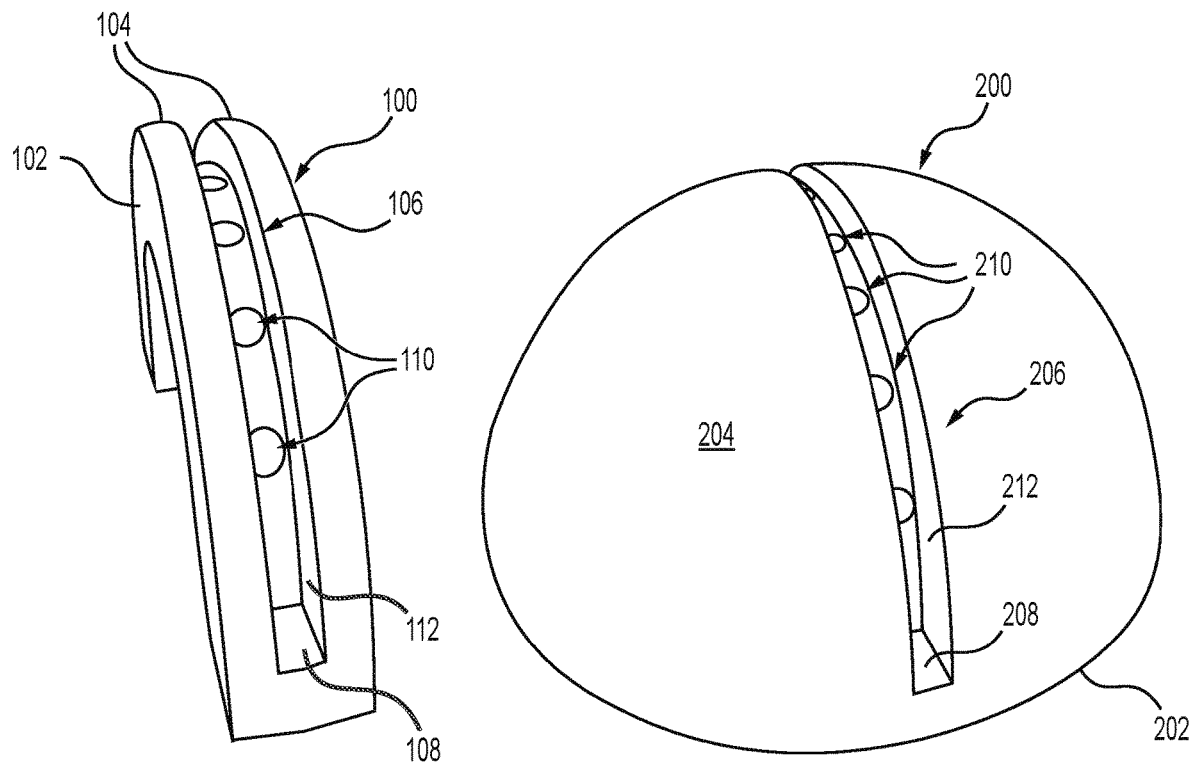
FIG. 1
FIG. 2
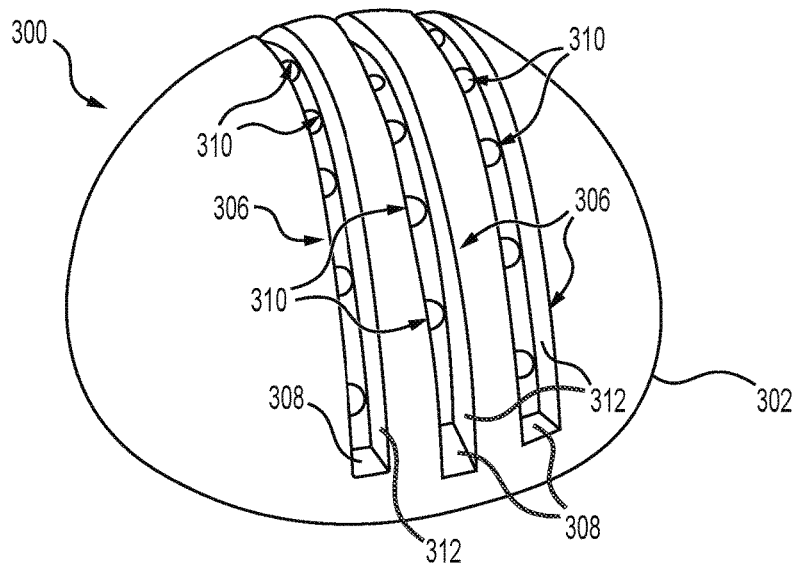
FIG. 3

COMPOSITE 3D-PRINTED CURVED ELEMENTS AND METHOD OF MAKING SAME

BACKGROUND

1. Field

The disclosure of the present patent application relates to curved architectural elements such as arches and domes, and particularly to composite 3D-printed curved elements and methods of making the elements.

2. Description of the Related Art

In general, curved architectural elements, such as arches and domes, are heavy elements that require either heavy equipment to place them, or a long building process to provide the necessary strength to support the element and other elements mounted on the arch or dome. Recently, 3D-printing has been employed to produce lightweight arches and domes having the required strength for supporting loads. Such 3D-printed curved elements, however, are subject to interfacial failure caused by excessive bending loads. FIG. 6 is a cross-section through a prior art 3D-printed arch PAPR with an infill pattern IP and multiple spaced plane reinforcements PR. The problem in the current technology of the reinforced 3D printing technology is that the plane reinforcements PR are built layer-by-layer, resulting in the reinforcement layers being parallel to each other and causing a weak interfacial resistance to shear failure stresses internally, especially for large curved members, such as arches and domes. When excessive bending loads, as shown in FIG. 6 by arrows BL, are applied to these prior art 3D-printed curved elements, they are subject to interfacial failure in the region of their plane reinforcements PR, as shown by arrows IF.

Thus, composite 3D-printed curved elements and methods of making same solving the aforementioned problems are desired.

SUMMARY

The composite 3D-printed curved elements and methods of making same provide arches and domes with high resistance to shear and flexural failure, thereby allowing the production of large, curved 3D-printed elements. The elements include a primary composite fused deposition modeling (FDM) 3D-printed component in the form of an arch or dome with one or more grooves on the outer surface, the inner surface, or both the outer and inner surfaces of the component. Each groove includes a plurality of deep, blind bores or slots spaced longitudinally along the bottom of the groove. In adjacent grooves, the slots are alternated in a zig-zag pattern, so that no two slots are too close to one another.

The primary composite component is reinforced by deposition of a composite reinforcement structure in the groove(s) and blind bores of the primary composite component. The reinforcement structure is made by first spraying a primer on the surfaces of the groove and the slots. A composite tape is applied to the bottom of the groove and is inserted into the deep slots using cured flat composite strips (CFCSs) that are then cut to be flush with the top of the tape. A second primer is then sprayed on the composite tape and the exposed portions of the CFCSs. A final epoxy layer is then applied by hand or by 3D printing to fill the groove to be flush with the outer surface. The epoxy may be UV cured if required.

These and other features of the present subject matter will become readily apparent upon further review of the following specification.

BRIEF DESCRIPTION OF THE DRAWINGS

FIG. 1 is a perspective view of a 3D-printed primary composite arch component.

FIG. 2 is a perspective view of a first embodiment of a 3D-printed primary composite dome component.

FIG. 3 is a perspective view of a second embodiment of a 3D printed primary composite dome component.

Similar reference characters denote corresponding features consistently throughout the attached drawings.

DETAILED DESCRIPTION OF THE PREFERRED EMBODIMENTS

Figure 4A:
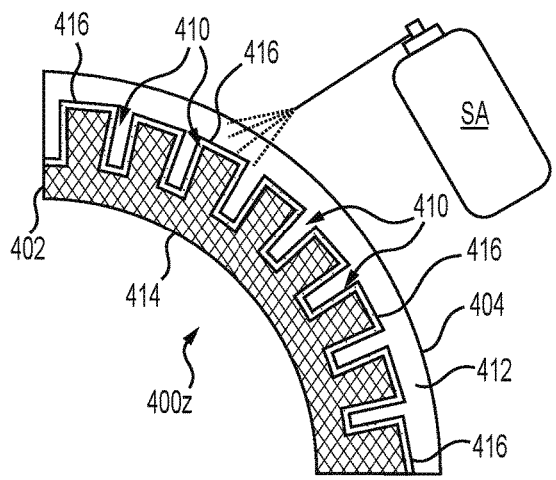
FIG. 4A is a side view in section of a first step of a method of making a first embodiment of a composite 3D-printed curved element.

The composite 3D-printed curved elements and methods of making same include a primary composite fused deposition modeling (FDM) 3D-printed component in the form of an arch or dome. An exemplary 3D-printed primary composite arch component 100 is shown in FIG. 1. The component 100 includes an arch component body 102 having an outer solid arch surface 104 including one or more (one shown) centrally located grooves 106 defined therein extending over a substantial arc. Each groove 106 includes two solid end walls 108 (one shown), two solid side walls 112 (one shown), and a solid bottom wall 114. A plurality of equally spaced blind bores 110 extend from the bottom wall 114 of the groove(s) 106 inward into the body 102. The inner portion of the 3D-printed primary composite arch component 100 includes an infill patterned portion, as shown and described with respect to the embodiments shown in FIGS. 4A-5.

A first embodiment of a 3D printed primary composite dome component 200 is shown in FIG. 2. The component 200 includes a dome component body 202 having an outer solid dome surface 204 including a centrally located groove 206 defined therein extending over a substantial arc. The groove 206 includes two solid end walls 208 (one shown), two solid side walls 212 (one shown), and a solid bottom wall 214. A plurality of equally spaced blind bores 210 extend from the bottom wall 214 of the groove 206 inward into the body 202. The inner portion of the 3D-printed primary composite dome component 200 includes an infill patterned portion, as shown and described with respect to the embodiments shown in FIGS. 4A-5.

A second embodiment of a 3D printed inner dome component 300 is shown in FIG. 3. The component 300 includes a dome component body 302 having an outer solid dome surface 304 including three centrally located grooves 306 defined therein extending over a substantial arc. Each groove 306 includes two solid end walls 308 (one shown), two solid side walls 312 (one shown), and a solid bottom wall 314. A plurality of equally spaced blind bores or slots 310 extend from the bottom wall 314 of the grooves 306 inward into the body 302. In adjacent grooves 306, the blind bores 310 are alternated in a zig-zag pattern, so that no two bores 310 are too close to one another. The inner portion of the 3D-printed primary composite dome component 300 includes an infill patterned portion, as shown and described with respect to the embodiments shown in FIGS. 4A-5.

The primary composite component 100, 200, 300 is reinforced by deposition of a composite reinforcement structure in the groove(s) and the blind bores of the primary composite component to produce the composite 3D-printed curved elements, as described below.

FIGS. 4A-4D are side views in section of a composite 3D-printed curved element 428, showing the steps of a method of making the element 428. It should be understood that the composite 3D-printed curved element 428 may be a composite 3D-printed arch or a composite 3D-printed dome, and the section views 4A-4D are taken through the center of a groove (leaving one of the sidewalls 412 viewable in FIGS. 4A-4C) and the interior of the blind bores 410 defined in a primary composite FDM 3D-printed component 400. The primary component 400 may be in the form of an arch, as with component 100 in FIG. 1, or a dome, as with components 200, 300 in FIGS. 2 and 3, respectively. As with the components 100, 200, 300, the primary component 400 further includes a component body 402 with an outer surface 404 and an infill patterned portion 414.

A first step of a method of reinforcing the primary component 400 to produce the composite 3D-printed curved element 428 is illustrated in FIG. 4A. In this step, a spray applicator SA is used to deposit a composite primer layer 416 on the surfaces of the blind bores 410 and the end, side, and bottom walls of the groove of the primary component 400. The composite primer layer 416 may be a light-curing/bonding agent, and a further step may include curing the composite primer layer 416 using a light source. After this first step, one or more passive load sensors (not shown) may be inserted into one or more of the blind bores 410. The sensors transmit a signal that can be used to monitor the internal stresses in the composite 3D-printed curved element 428.

Figure 4B:
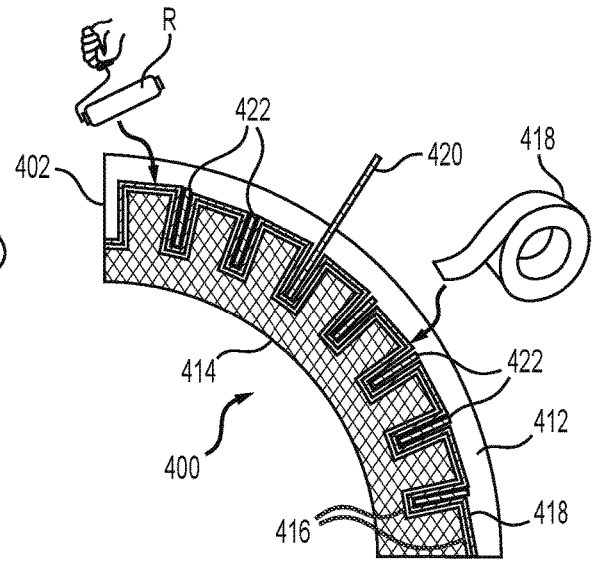
FIG. 4B is a side view in section of a second step of a method of making a first embodiment of a composite 3D-printed curved element.

FIG. 4B illustrates several further steps of the method to produce the composite curved element 428. In a further step, a composite tape 418 is applied to the bottom wall of the groove and inserted into the blind bores 410 using cured flat composite strips (CFCS s) 420. The composite tape 418 may include carbon fiber, glass fiber, Kevlar®, or other reinforcing materials. At the blind bores 410, the tape 418 is pushed and folded by the cured flat composite strips 420 into the blind bores 410. After insertion, the cured flat composite strips 420 are trimmed to be flush with the adjacent tape 418 to form flush cut strips 422. This keeps the composite tape 418 tight inside the blind bores 410, and reduces the chance of any loosening of the tape 418. Once all of the strips 420 are trimmed to be flush with the adjacent tape 418, a roller R may be used to apply pressure to the tape 418 and the flush cut strips 422 to remove any voids under the tape 418, so that the tape 418 is applied with a forced push on the surface by the roller R to keep the tape in touch with the primer.

Figure 4C:
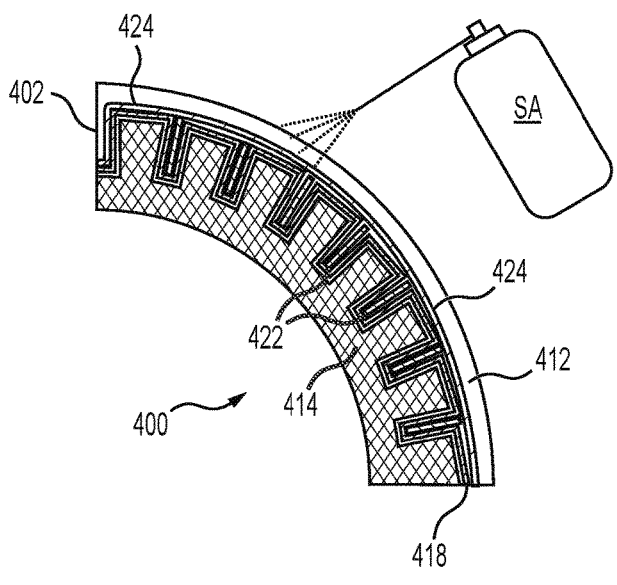
FIG. 4C is a side view in section of a third step of a method of making a first embodiment of a composite 3D-printed curved element.

FIG. 4C illustrates a further step of reinforcing the primary component 400. In this step, a spray applicator SA is used to deposit a second composite primer layer 424 on the exterior surfaces of the tape 418, the flush cut strips 422, and the end and side walls of the groove of the primary component 400. The second composite primer layer 424 may be a light-curing/bonding agent, and a further step may include curing the composite primer layer 424 using a light source.

Figure 4D:
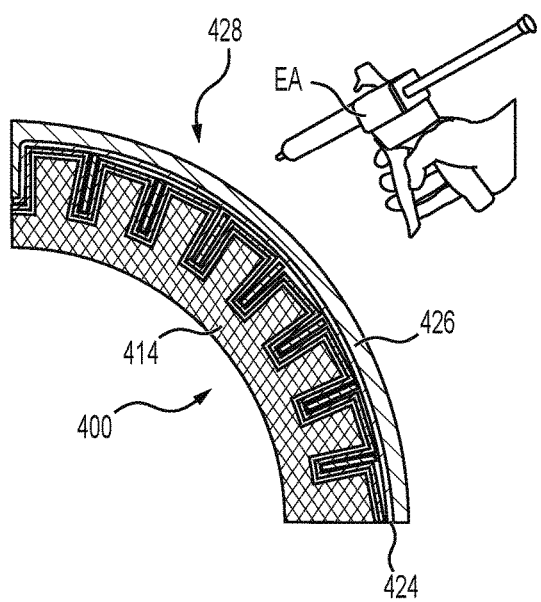
FIG. 4D is a side view in section of a fourth step of a method of making a first embodiment of a composite 3D-printed curved element.

FIG. 4D illustrates a final step of the method of reinforcing the primary component 400 to produce the composite 3D-printed curved element 428. In this step, an epoxy applicator EA or a 3D-printing procedure is used to deposit an epoxy groove-filling layer 426 on the coated exterior surfaces of the tape 418, the coated flush cut strips 422, and the coated end and side walls of the groove of the primary component 400. The epoxy is deposited until the epoxy layer 426 is flush with the outer surface 404 of the component body 402, thereby completely filling the groove of the primary component 400. The epoxy layer 426 may be allowed to cure over time, or a UV light can be used to accelerate the process, based on the epoxy used. Once the epoxy layer 426 has cured, the method of producing the composite 3D-printed curved element 428 is complete.

Figure 5:
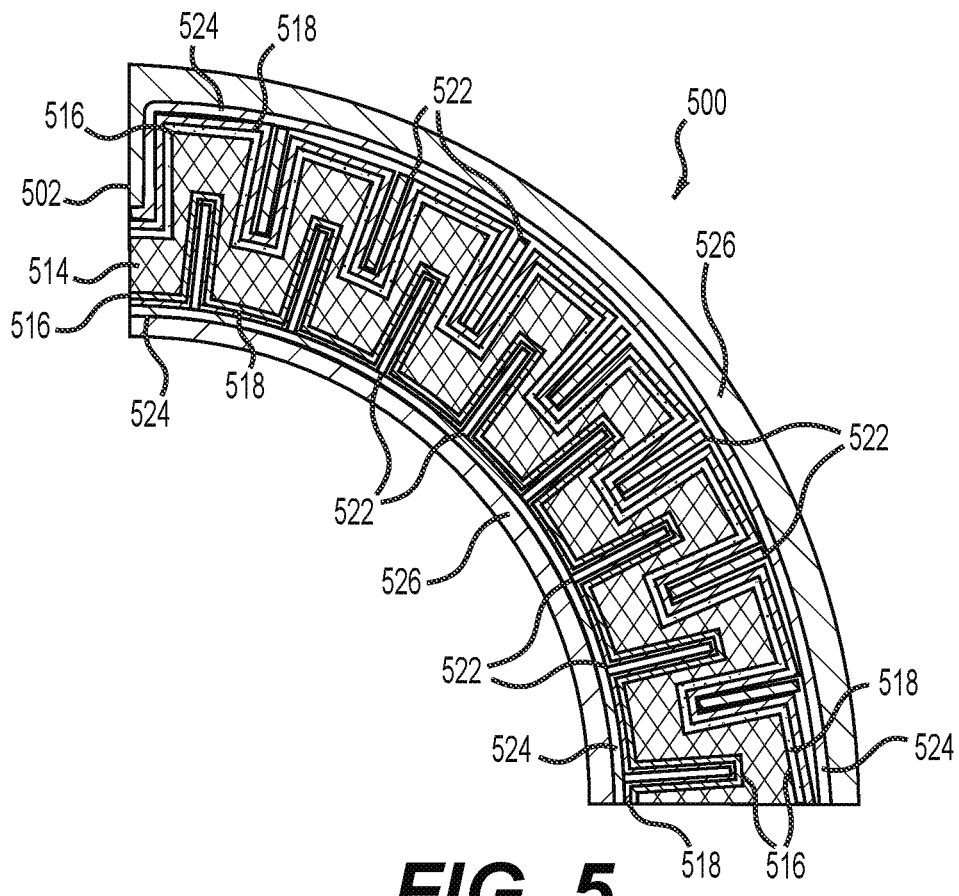
FIG. 5 is a side view in section of another embodiment of a composite 3D-printed curved element.
Figure 6:
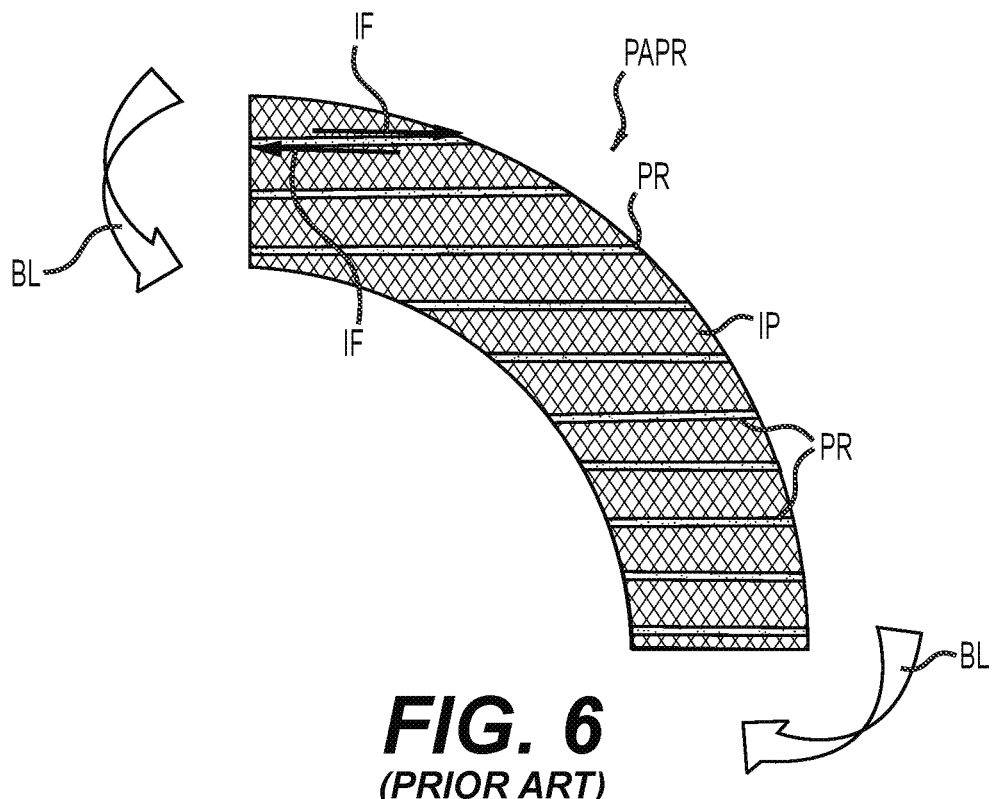
FIG. 6 is cross-sectional view of a 3D-printed curved element according to the prior art.

A further embodiment of a completed composite 3D-printed curved element 500 is shown in FIG. 5. It should be understood that the composite 3D-printed curved element 500 may be a composite 3D-printed arch or a composite 3D-printed dome, and the section view shown in FIG. 5 is taken through the center of grooves 506 and blind bores 510 of a primary composite FDM 3D-printed component body 502. The primary component body 502 may be in the form of an arch, as with component 100 in FIG. 1, or a dome, as with components 200, 300 in FIGS. 2 and 3, respectively. As with the components 100, 200, 300, 400, the primary component body 502 further includes an outer surface and an infill patterned portion 514. In addition to an outer surface, the primary component body 502 also includes an inner surface. In addition to the groove 506 and the blind bores 510 defined in the outer surface, the primary component body 502 also includes a groove 506 and blind bores 510 on its inner surface, with the infill patterned portion 514 being between the inner and outer surfaces.

The composite 3D-printed curved element 500, is formed using the same method as described above with respect to the composite 3D-printed curved element 428, the method steps being applied to both the inner and outer grooves 506 and blind bores 510. Similar to the curved element 428, the curved element 500 further includes a first primer layer 516, composite tape 518, flush cut strips 522, a second primer coat 524 and an epoxy groove filling layer 526.

It is to be understood that the composite 3D-printed curved elements and methods of making same are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A method of making a composite curved element, the method comprising the steps of:
    providing a primary composite component, the primary composite component including:
        a curved solid body having an outer surface;
        at least one centrally located groove defined in the curved solid body, the groove having two solid side walls and a solid bottom wall and extending over a substantial arc; and
        a plurality of equally spaced blind bores extending into the solid bottom wall inward from the solid bottom wall into the curved solid body; and
    depositing a composite reinforcement structure in the at least one centrally located groove and into the blind bores of the primary composite component.

2. The method of making a composite element as recited in claim 1, wherein the step of depositing a composite reinforcement structure comprises spraying a first composite primer layer on the surfaces of the at least one groove and the blind bores.

3. The method of making a composite curved element as recited in claim 2, wherein the step of depositing a composite reinforcement structure further comprises applying a composite tape to the bottom wall of the at least one groove and inserting the tape into the blind bores.

4. The method of making a composite curved element as recited in claim 3, wherein the step of inserting the tape into the blind bores comprises using cured flat composite strips to insert the tape into the blind bores.

5. The method of making a composite curved element as recited in claim 4, wherein the step of depositing a composite reinforcement structure further comprises trimming the cured flat composite strips such that the strips have top ends flush with a top surface of the composite tape.

6. The method of making a composite curved element as recited in claim 5, wherein the step of depositing a composite reinforcement structure further comprises spraying a second composite primer layer on the top surface of the tape, the top ends of the trimmed, cured flat composite strips, and the side walls of the at least one groove of the primary component.

7. The method of making a composite curved element as recited in claim 6, wherein the step of depositing a composite reinforcement structure further comprises depositing an epoxy groove filling layer on the coated exterior surfaces of the tape, the coated flush cut strips, and the coated side walls of the at least one groove until the epoxy layer is flush with the outer surface of the component body.

8. The method of making a composite curved element as recited in claim 7, wherein:
    the first and second composite primer layers include a light-curing and bonding agent; and
    the step of depositing a composite reinforcement structure further comprises curing the composite primer layers after spraying them using a light source.

9. The method of making a composite curved element as recited in claim 8, wherein the step of depositing a composite reinforcement structure further comprises applying pressure to the tape and the flush cut strips using a roller after trimming the cured flat composite strips.

* * * * *